US009444991B2

(12) United States Patent
Liang et al.

(10) Patent No.: US 9,444,991 B2
(45) Date of Patent: Sep. 13, 2016

(54) ROBUST LAYERED LIGHT-FIELD RENDERING

(71) Applicant: Lytro, Inc., Mountain View, CA (US)

(72) Inventors: Chia-Kai Liang, San Jose, CA (US); Colvin Pitts, Snohomish, WA (US)

(73) Assignee: Lytro, Inc., Mountain View, CA (US)

( * ) Notice: Subject to any disclaimer, the term of this patent is extended or adjusted under 35 U.S.C. 154(b) by 107 days.

(21) Appl. No.: 14/540,922

(22) Filed: Nov. 13, 2014

(65) Prior Publication Data

US 2016/0142615 A1    May 19, 2016

(51) Int. Cl.
G06K 9/00    (2006.01)
H04N 5/232   (2006.01)

(52) U.S. Cl.
CPC ...... *H04N 5/23212* (2013.01); *H04N 5/23293* (2013.01); *G06T 2207/10052* (2013.01)

(58) Field of Classification Search
None
See application file for complete search history.

(56) References Cited

U.S. PATENT DOCUMENTS

| | | | |
|---|---|---|---|
| 4,661,986 A | 4/1987 | Adelson | |
| 5,748,371 A | 5/1998 | Cathey, Jr. et al. | |
| 6,466,207 B1 | 10/2002 | Gortler et al. | |
| 7,620,309 B2 | 11/2009 | Georgiev | |
| 7,623,726 B1 | 11/2009 | Georgiev | |
| 7,936,392 B2 | 5/2011 | Ng et al. | |
| 7,949,252 B1 | 5/2011 | Georgiev | |
| 8,290,358 B1 | 10/2012 | Georgiev | |
| 8,559,705 B2 | 10/2013 | Ng | |
| 8,724,014 B2 | 5/2014 | Ng et al. | |
| 8,811,769 B1 | 8/2014 | Pitts et al. | |
| 8,831,377 B2 | 9/2014 | Pitts et al. | |
| 2007/0252074 A1 | 11/2007 | Ng et al. | |
| 2007/0269108 A1 | 11/2007 | Steinberg et al. | |
| 2008/0056569 A1 | 3/2008 | Williams et al. | |
| 2008/0131019 A1 | 6/2008 | Ng | |
| 2012/0057040 A1 | 3/2012 | Park et al. | |
| 2012/0327222 A1 | 12/2012 | Ng et al. | |
| 2014/0013273 A1 | 1/2014 | Ng | |
| 2014/0049663 A1 | 2/2014 | Ng et al. | |
| 2014/0176540 A1* | 6/2014 | Tosic ..................... G06T 17/00 345/420 |
| 2014/0204111 A1* | 7/2014 | Vaidyanathan .... G02B 27/0075 345/592 |
| 2014/0211077 A1 | 7/2014 | Ng et al. | |
| 2015/0206340 A1* | 7/2015 | Munkberg ............ G06T 15/503 345/426 |

OTHER PUBLICATIONS

Munkberg, Jacob, et al., "Layered Reconstruction for Defocus and Motion Blur", EGSR 2014, pp. 1-12.
Shade, Jonathan, et al., "Layered Depth Images", SIGGRAPH 98, pp. 1-2.

* cited by examiner

*Primary Examiner* — Andrew Moyer
(74) *Attorney, Agent, or Firm* — Raubvogel Law Office

(57) ABSTRACT

According to various embodiments, the system and method disclosed herein process light-field image data so as to prevent, mitigate, and/or remove artifacts and/or other image degradation effects. A light-field image may be captured with a light-field image capture device with a microlens array. Based on a depth map of the light-field image, a plurality of layers may be created, and samples from the light-field image may be projected onto the layers to create a plurality of layer images. The layer images may be processed with one or more algorithms such as an inpainting algorithm to fill null values, a reconstruction algorithm to correct degradation effects from capture, and/or an enhancement algorithm to adjust the color, brightness, contrast, and/or sharpness of the layer image. Then, the layer images may be combined to generate a processed light-field image.

31 Claims, 12 Drawing Sheets

ROBUST LAYERED LIGHT-FIELD RENDERING

CROSS-REFERENCE TO RELATED APPLICATIONS

The present application is related to U.S. application Ser. No. 13/774,925 for "Compensating for Sensor Saturation and Microlens Modulation During Light-Field Image Processing", filed Feb. 22, 2013, the disclosure of which is incorporated herein by reference in its entirety.

The present application is related to U.S. Provisional Application Ser. No. 61/604,155 for "Compensating for Sensor Saturation and Microlens Modulation During Light-Field Image Processing", filed on Feb. 28, 2012, the disclosure of which is incorporated herein by reference in its entirety.

The present application is related to U.S. Provisional Application Ser. No. 61/604,175 for "Compensating for Variation in Microlens Position During Light-Field Image Processing", filed on Feb. 28, 2012, the disclosure of which is incorporated herein by reference in its entirety.

The present application is related to U.S. Provisional Application Ser. No. 61/604,195 for "Light-Field Processing and Analysis, Camera Control, and User Interfaces and Interaction on Light-Field Capture Devices", filed on Feb. 28, 2012, the disclosure of which is incorporated herein by reference in its entirety.

The present application is related to U.S. Provisional Application Ser. No. 61/655,790 for "Extending Light-Field Processing to Include Extended Depth of Field and Variable Center of Perspective", filed on Jun. 5, 2012, the disclosure of which is incorporated herein by reference in its entirety.

The present application is related to U.S. Utility application Ser. No. 13/688,026 for "Compensating for Variation in Microlens Position During Light-Field Image Processing", filed on Nov. 28, 2012, the disclosure of which is incorporated herein by reference in its entirety.

The present application is related to U.S. Utility application Ser. No. 11/948,901 for "Interactive Refocusing of Electronic Images," filed Nov. 30, 2007, the disclosure of which is incorporated herein by reference in its entirety.

The present application is related to U.S. Utility application Ser. No. 12/703,367 for "Light-field Camera Image, File and Configuration Data, and Method of Using, Storing and Communicating Same," filed Feb. 10, 2010, the disclosure of which is incorporated herein by reference in its entirety.

The present application is related to U.S. Utility application Ser. No. 13/027,946 for "3D Light-field Cameras, Images and Files, and Methods of Using, Operating, Processing and Viewing Same", filed on Feb. 15, 2011, the disclosure of which is incorporated herein by reference in its entirety.

The present application is related to U.S. Utility application Ser. No. 13/155,882 for "Storage and Transmission of Pictures Including Multiple Frames," filed Jun. 8, 2011, the disclosure of which is incorporated herein by reference in its entirety.

The present application is related to U.S. Utility application Ser. No. 13/664,938 for "Light-field Camera Image, File and Configuration Data, and Method of Using, Storing and Communicating Same," filed Oct. 31, 2012, the disclosure of which is incorporated herein by reference in its entirety.

The present application is related to U.S. Utility application Ser. No. 13/774,971 for "Compensating for Variation in Microlens Position During Light-Field Image Processing," filed Feb. 22, 2013, the disclosure of which is incorporated herein by reference in its entirety.

The present application is related to U.S. Utility application Ser. No. 13/774,986 for "Light-Field Processing and Analysis, Camera Control, and User Interfaces and Interaction on Light-Field Capture Devices," filed Feb. 22, 2013, the disclosure of which is incorporated herein by reference in its entirety.

TECHNICAL FIELD

The present disclosure relates to systems and methods for processing and displaying light-field image data, and more specifically, to systems and methods for preventing, mitigating, and/or removing artifacts in output images.

BACKGROUND

In conventional photography, the camera must typically be focused at the time the photograph is taken. The resulting image may have only color data for each pixel; accordingly, any object that was not in focus when the photograph was taken cannot be brought into sharper focus because the necessary data does not reside in the image.

By contrast, light field images typically encode additional data for each pixel related to the trajectory of light rays incident to that pixel when the light field image was taken. This data can be used to manipulate the light field image through the use of a wide variety of rendering techniques that are not possible to perform with a conventional photograph. In some implementations, a light field image may be refocused and/or altered to simulate a change in the center of perspective (CoP) of the camera that received the image. Further, a light field image may be used to generate an enhanced depth-of-field (EDOF) image in which all parts of the image are in focus.

Unfortunately, the resulting EDOF image may have undesirable effects that appear out-of-place to a viewer. Some such effects may occur as a result of image degradation that occurs during the image capture process, such as blurring due to focusing or noise. Further, these effects may include artifacts caused by the image processing used. More particularly, image processing performed on EDOF images can create unwanted artifacts because the depth map accuracy as well as the light field data itself can have strong depth-dependent variation in terms of sampling, prefiltering, and noise level. Different processing parameters may be appropriate for different depths, making it difficult to parallelize processing flow. Furthermore, mismatches in parameters between nearby regions of different depths can yield visible (and unwanted) discontinuities in the processed image.

It would be an advancement in the art to provide processing systems and methods capable of preventing, removing, and/or mitigating such effects.

SUMMARY

According to various embodiments, the system and method of the technology described herein process light-field image data so as to prevent, remove, and/or mitigate undesirable effects such as color artifacts, projection artifacts, and the like. These techniques operate, for example, on extended depth-of field (EDOF) images obtained from light-field data.

A light-field image may be captured with a light-field image capture device with a microlens array. Based on a depth map of the light-field image, a plurality of layers may be created. This may be done by using the parameters of one or more image processing algorithms to be applied subsequently to determine the maximum depth spacing between layers, and then defining the layers such that the layers are spaced apart, at most, by the maximum depth spacing. Each layer may have a representative depth, a maximum depth, and a minimum depth.

Once the layers have been created, a layer image may be created for each layer by projecting samples from the light-field image into each layer. Each layer may receive one or more samples that are, in the depth map, between the minimum and maximum depths for that layer. Thus, the resulting layer images may each contain one or more samples that are of the appropriate depth range, in the depth map, for that layer.

Once the layer images have been generated, image processing may be carried out on each layer image individually through the use of one or more image processing algorithms. Such image processing algorithms may include an inpainting algorithm to fill null values, a reconstruction algorithm to correct degradation effects from capture, and/or an enhancement algorithm to adjust the color, brightness, contrast, and/or sharpness of the layer image.

If desired, the image processing algorithms may use different parameters for each layer. Thus, samples within a common depth of the light-field image may be processed in a manner similar to each other. Conversely, samples of different depths may be processed differently from each other.

After application of the one or more image processing algorithms, the layer images may be combined to generate a processed light-field image. This may be done by applying a Gaussian kernel or through the use of other methods by which the contribution of each layer to the processed light-field image is determined. This may be done for each subset of the depth map by applying the sample in a layer in proportion to the proximity of its depth (i.e., the representative depth of the layer) to that of the depth map at that subset. Thus, the processed light-field image may include samples at the appropriate depth to match the depth map. The processed light-field image may be displayed for a user.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DEFINITIONS

For purposes of the description provided herein, the following definitions are used:
  depth: a representation of displacement between an object and/or corresponding image sample and a microlens array of a camera.
  depth map: a two-dimensional map corresponding to a light-field image, indicating a depth for each of multiple pixel samples within the light-field image.
  disk: a region in a light-field image that is illuminated by light passing through a single microlens; may be circular or any other suitable shape.
  extended depth of field (EDOF) image: an image that has been processed to have objects in focus along a greater depth range.
  image: a two-dimensional array of pixel values, or pixels, each specifying a color.
  image processing algorithm: any computer-implemented procedure for modifying an image.
  layer: a subset of a three-dimensional space.
  layer image: an image associated with a layer.
  light-field image: an image that contains a representation of light field data captured at the sensor.
  microlens: a small lens, typically one in an array of similar microlenses.
  processed light-field image: the resulting image after one or more processing steps are applied to a light-field image.
  sample: one or more pixels of an image.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 2:
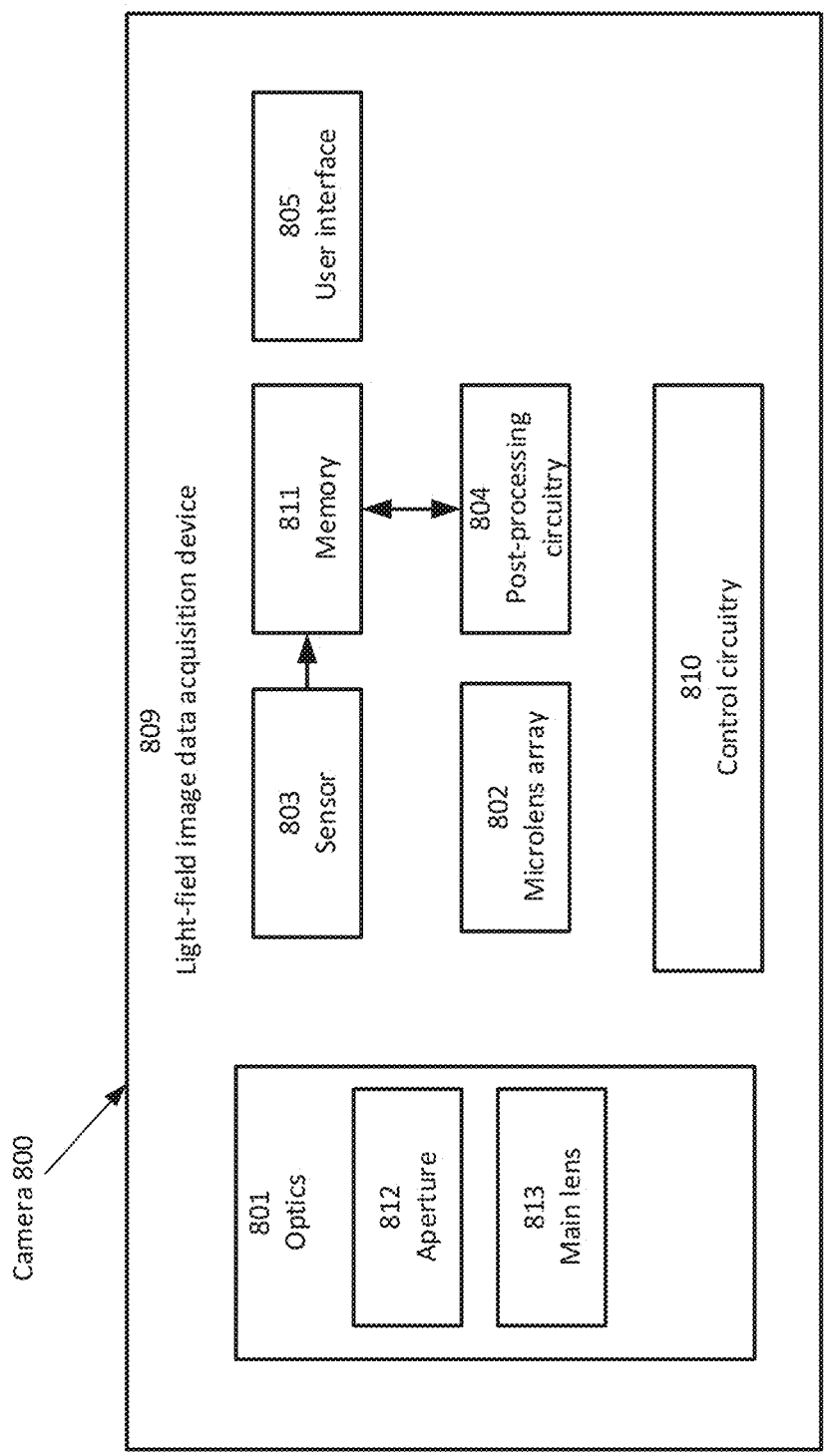
FIG. 2 depicts an example of an architecture for implementing the methods of the present disclosure in a light-field capture device, according to one embodiment.
Figure 3:
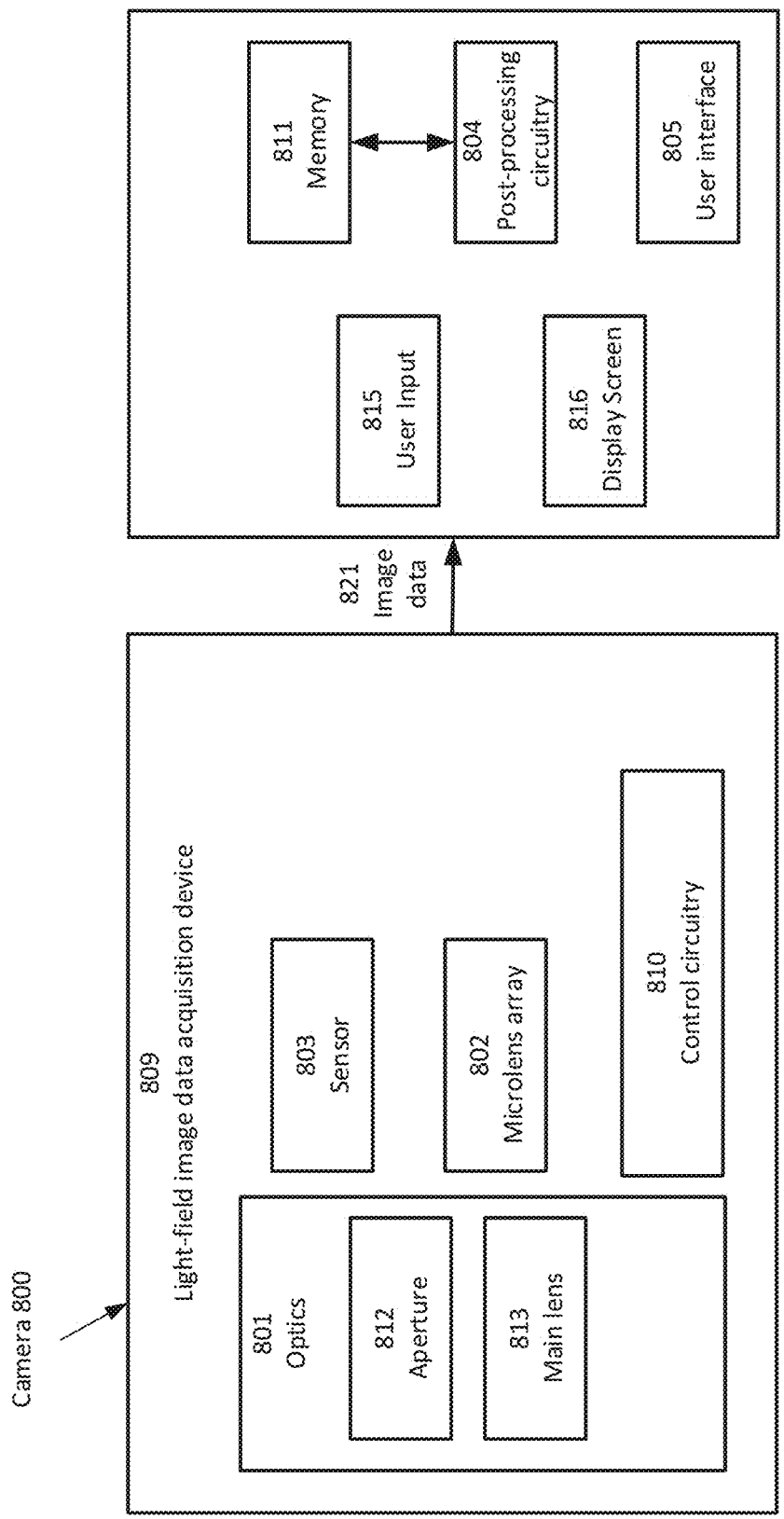
FIG. 3 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 2, there is shown a block diagram depicting an architecture for implementing the method of the present disclosure in a light-field capture device such as a camera 800. Referring now also to FIG. 3, there is shown a block diagram depicting an architecture for implementing the method of the present disclosure in a post-processing system communicatively coupled to a light-field capture device such as a camera 800, according to one embodiment. One skilled in the art will recognize that the particular configurations shown in FIGS. 2 and 3 are merely exemplary, and that other architectures are possible for camera 800. One skilled in the art will further recognize that several of the components shown in the configurations of FIGS. 2 and 3 are optional, and may be omitted or reconfigured.

Figure 4:
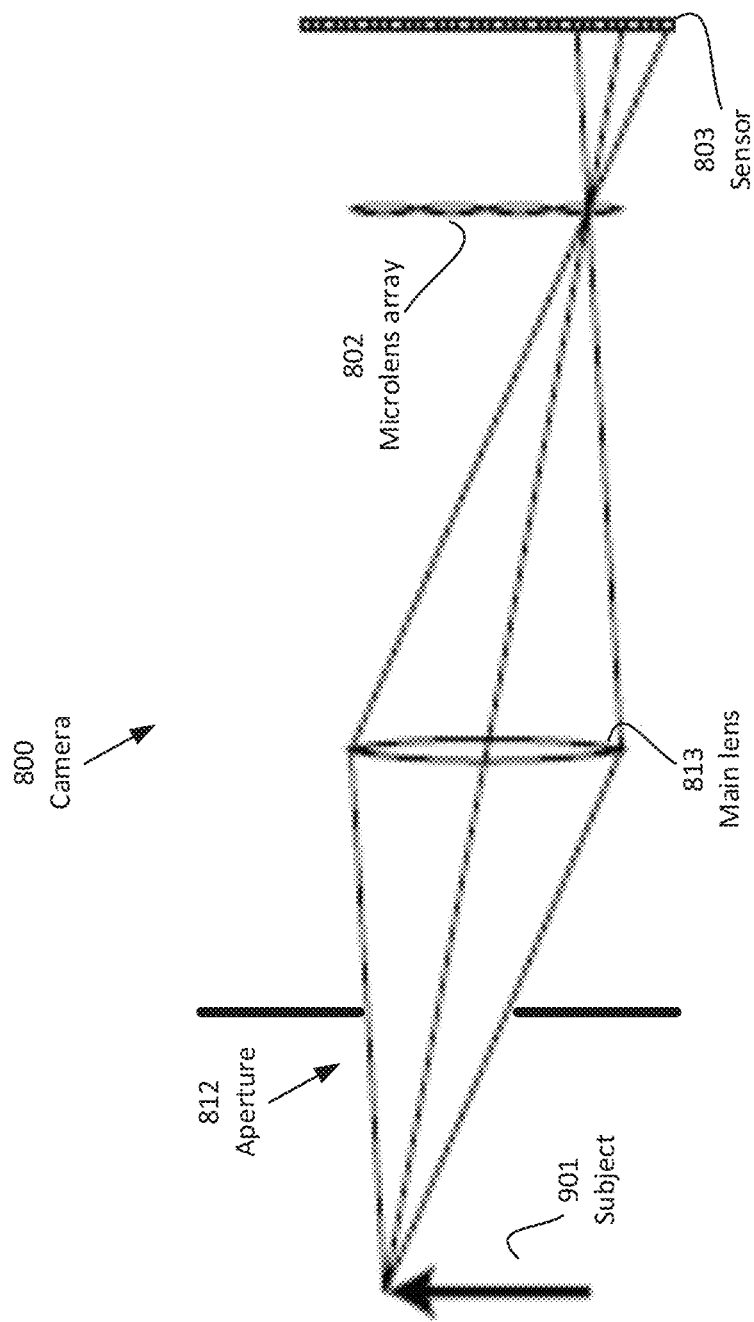
FIG. 4 depicts an example of an architecture for a light-field camera for implementing the methods of the present disclosure according to one embodiment.

In at least one embodiment, camera 800 may be a light-field camera that includes light-field image data acquisition device 809 having optics 801, image sensor 803 (including a plurality of individual sensors for capturing pixels), and microlens array 802. Optics 801 may include, for example, aperture 812 for allowing a selectable amount of light into camera 800, and main lens 813 for focusing light toward microlens array 802. In at least one embodiment, microlens array 802 may be disposed and/or incorporated in the optical path of camera 800 (between main lens 813 and sensor 803) so as to facilitate acquisition, capture, sampling of, recording, and/or obtaining light-field image data via sensor 803. Referring now also to FIG. 4, there is shown an example of an architecture for a light-field camera 800 for implementing the method of the present disclosure according to one embodiment. The Figure is not shown to scale. FIG. 4 shows, in conceptual form, the relationship between aperture 812, main lens 813, microlens array 802, and sensor 803, as such components interact to capture light-field data for subject 901.

In at least one embodiment, light-field camera 800 may also include a user interface 805 for allowing a user to provide input for controlling the operation of camera 800 for capturing, acquiring, storing, and/or processing image data.

In at least one embodiment, light-field camera 800 may also include control circuitry 810 for facilitating acquisition, sampling, recording, and/or obtaining light-field image data. For example, control circuitry 810 may manage and/or control (automatically or in response to user input) the acquisition timing, rate of acquisition, sampling, capturing, recording, and/or obtaining of light-field image data.

In at least one embodiment, camera 800 may include memory 811 for storing image data, such as output by image sensor 803. Such memory 811 can include external and/or internal memory. In at least one embodiment, memory 811 can be provided at a separate device and/or location from camera 800.

For example, camera 800 may store raw light-field image data, as output by sensor 803, and/or a representation thereof, such as a compressed image data file. In addition, as described in related U.S. Utility application Ser. No. 12/703,367 for "Light-field Camera Image, File and Configuration Data, and Method of Using, Storing and Communicating Same," filed Feb. 10, 2010, memory 811 can also store data representing the characteristics, parameters, and/or configurations (collectively "configuration data") of device 809.

In at least one embodiment, captured image data is provided to post-processing circuitry 804. Such circuitry 804 may be disposed in or integrated into light-field image data acquisition device 809, as shown in FIG. 2, or it may be in a separate component external to light-field image data acquisition device 809, as shown in FIG. 3. Such separate component may be local or remote with respect to light-field image data acquisition device 809. Any suitable wired or wireless protocol can be used for transmitting image data 821 to circuitry 804; for example camera 800 can transmit image data 821 and/or other data via the Internet, a cellular data network, a WiFi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 815 and/or a display screen 816. If desired, light-field image data may be displayed for the user on the display screen 816.

Overview

Light-field images often include a plurality of projections (which may be circular or of other shapes) of aperture 812 of camera 800, each projection taken from a different vantage point on the camera's focal plane. The light-field image may be captured on sensor 803. The interposition of microlens array 802 between main lens 813 and sensor 803 causes images of aperture 812 to be formed on sensor 803, each microlens in array 802 projecting a small image of main-lens aperture 812 onto sensor 803. These aperture-shaped projections are referred to herein as disks, although they need not be circular in shape. The term "disk" is not intended to be limited to a circular region, but can refer to a region of any shape.

Figure 1:
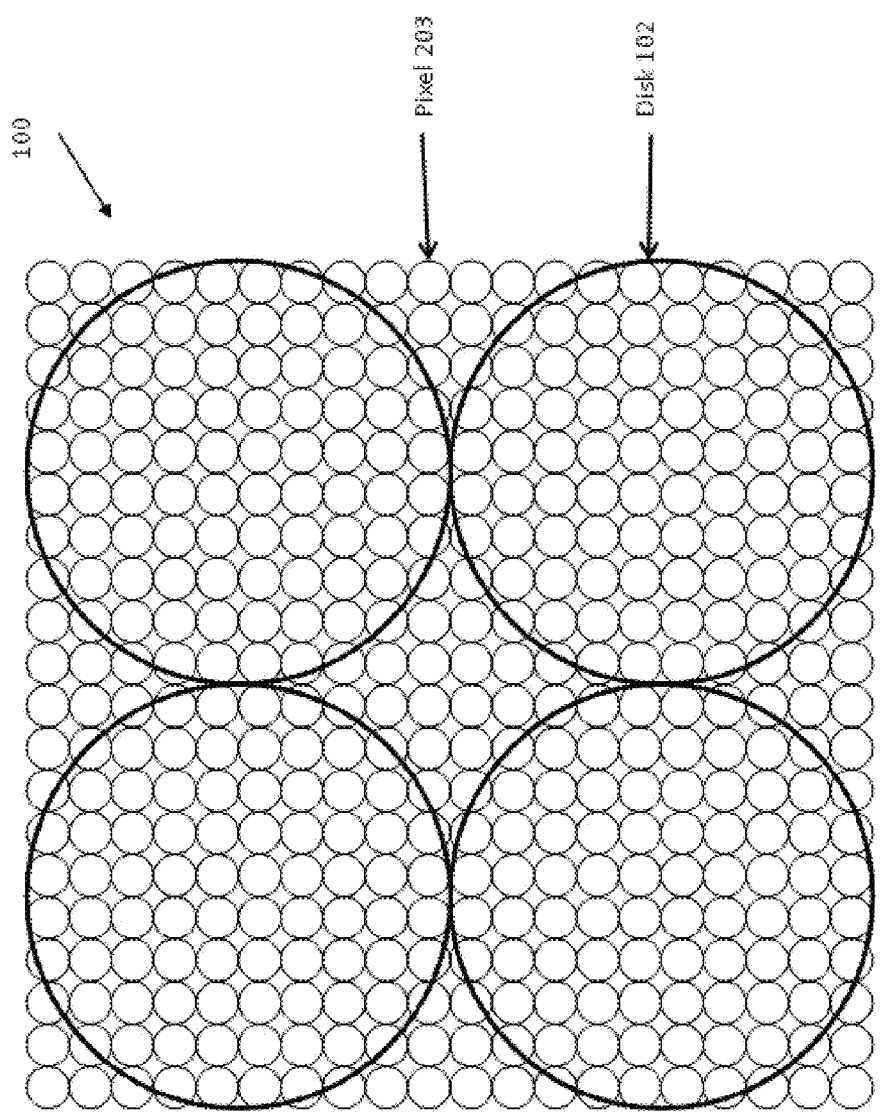
FIG. 1 depicts a portion of a light-field image.

Light-field images include four dimensions of information describing light rays impinging on the focal plane of camera 800 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 203; for illustrative purposes, each disk 102 is ten pixels 203 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing," filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Any number of image processing techniques can be used to reduce color artifacts, reduce projection artifacts, increase dynamic range, and/or otherwise improve image quality. Examples of such techniques, including for example modulation, demodulation, and demosaicing, are described in related U.S. application Ser. No. 13/774,925 for "Compensating for Sensor Saturation and Microlens Modulation During Light-Field Image Processing" filed Feb. 22, 2013, the disclosure of which is incorporated herein by reference.

In particular, processing can be performed on enhanced depth-of-field (EDOF) image in which all parts of the image are in focus. However, such processing steps may be of limited use in conventional operation on EDOF images, because the depth map accuracy as well as the light field data itself can have strong depth-dependent variation in terms of sampling, prefiltering, and noise level. Processing the entire EDOF output as a single 2D image can result in unwanted artifacts, especially when highly spatially-unstable processing techniques are used in enhancing the image. Accordingly, in at least one embodiment, a layered image processing technique is used.

Layered Image Processing

As mentioned above, various image processing steps may be used to prevent, remove, and/or mitigate undesired effects in an EDOF image generated from projection of light-field data. Such effects may be present as a result of depth-dependent variation in terms of sampling, pre-filtering, and/or noise level. In particular, such undesired effects can result from the fact that neighboring pixels in the EDOF image may have been generated from light field data of different depths.

In one embodiment, such undesired effects can be reduced or eliminated by separating the light-field image into layers based on depths. This may be done through the use of a depth map generated for the light-field image. The depth map may be used to create the layers at the appropriate depths and project samples from the light-field image into each layer, thereby generating layer images. Each layer image may include one or more samples from the light-field image that are within the same depth range. The layers may each be processed through the use of any of a wide variety of image processing algorithms. Then, the layer images may be combined to generate a processed light-field image in which the undesired effects are prevented, mitigated, and/or removed.

Figure 5:
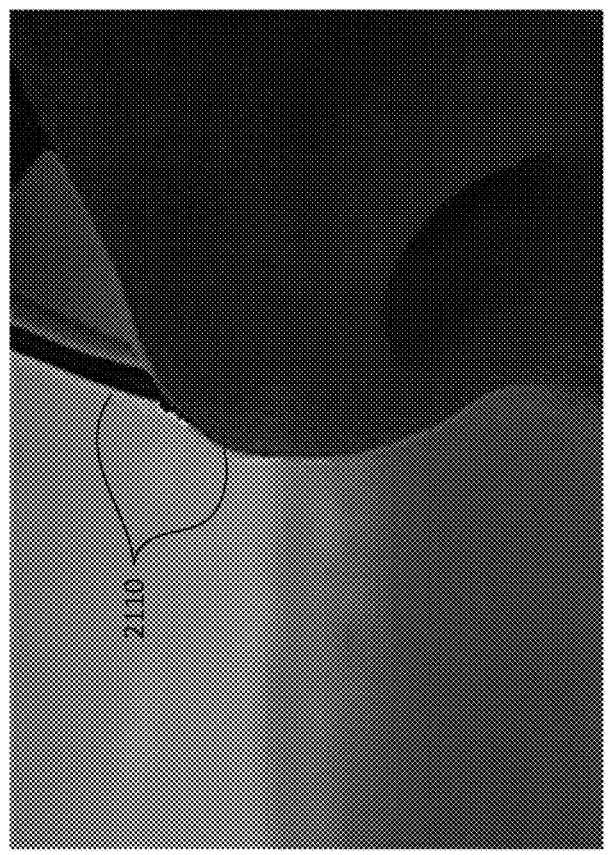
FIG. 5 is an exemplary image with artifacts that may be avoided with layered processing.

FIG. 5 is an exemplary image 2100 with artifacts 2110 that may be avoided with layered processing. The exemplary image 2100 may be an EDOF image that has been processed with a common unsharp masking (USM) algorithm or the like. Further, image processing steps such as denoising, sharpening, color correction and/or enhancement may have been used to create the exemplary image 2100. As shown, the artifacts 2110 include a clear unnatural seam between the nose and glasses of the person, and the background of the image.

Traditional two-dimensional image processing techniques may not be effective in preventing, mitigating, and/or removing the artifacts 2110. This is because different portions of the exemplary image 2100 are formed by light rays from different depths. Thus, the processing parameters that can be effective for processing one portion of the exemplary image 2100 may not be effective for other portions of the exemplary image 2100.

Specifically, because the processing parameters change dynamically with depth, the processing flow may become irregular and difficult to parallelize. Also, processing can create visible artifacts due to a mismatch in parameters between nearby regions of different depths. Many traditional image enhancement algorithms cannot be trivially modified to support dynamic parameter changes across different portions of an image having different depths.

The layered processing steps of the present disclosure may be used to obtain a superior result. Such layered processing steps may be applied to an image such as exemplary image 2100, after application of other image processing techniques. Additionally or alternatively, the layered processing steps of the present disclosure may be applied to the light-field image from which the image such as exemplary image 2100 was obtained, i.e., in place of the conventional two-dimensional image processing steps used to generate the image such as exemplary image 2100.

Figure 6:
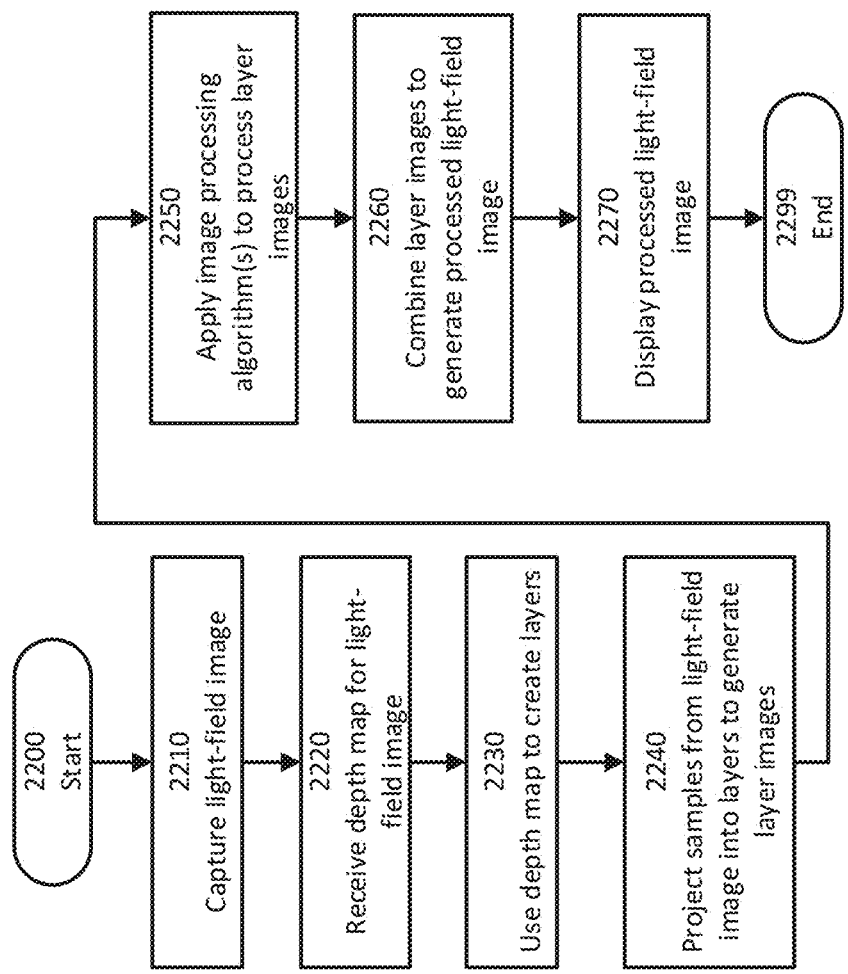
FIG. 6 is a flow diagram depicting a method of carrying out layered processing, according to one embodiment.
Figure 7:
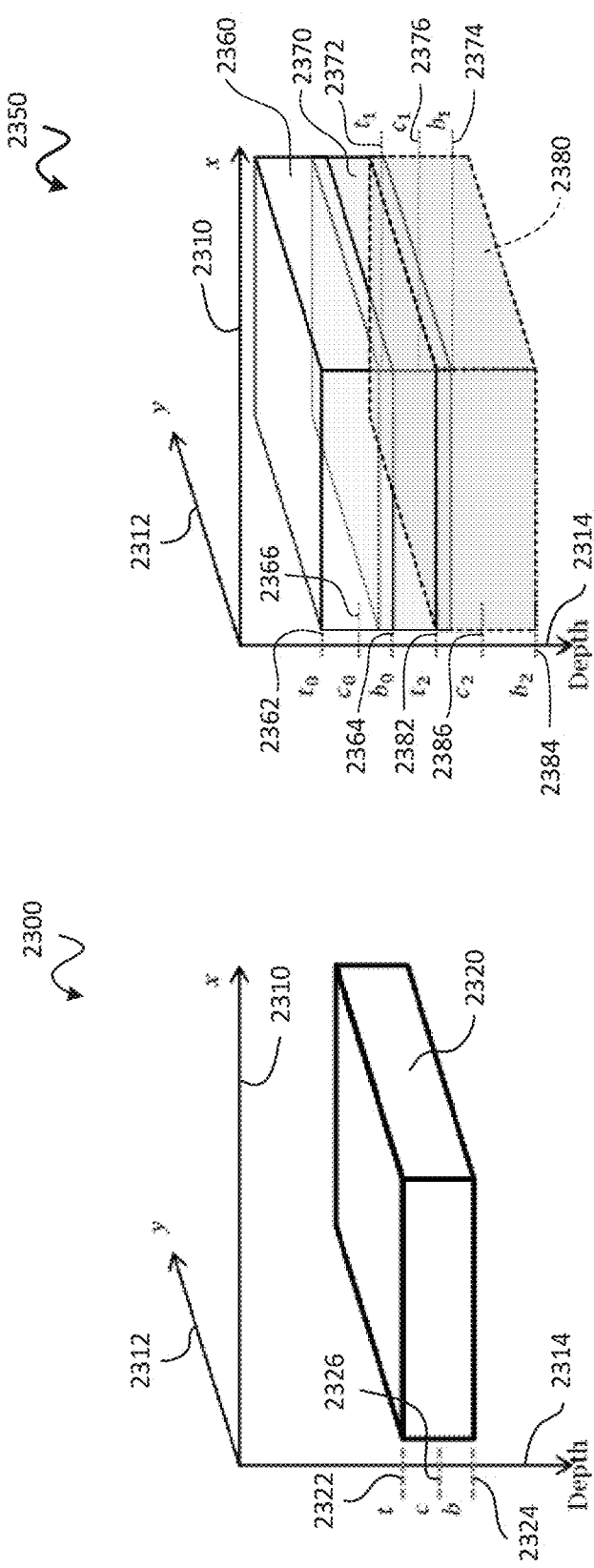
FIGS. 7A and 7B are image depth spaces illustrating one layer and three layers, respectively.

FIG. 6 is a flow diagram depicting a method of carrying out layered processing, according to one embodiment. The method may be performed, for example, with circuitry such as the post-processing circuitry 804 of the camera 800 of FIG. 2 or the post-processing circuitry 804 of FIG. 3, which is independent of the camera 800. In some embodiments, a computing device may carry out the method; such a computing device may include one or more of desktop computers, laptop computers, smartphones, tablets, cameras, and/or other devices that process digital information.

The method may start 2200 with a step 2210 in which the light-field image is captured, for example, by the sensor 803 of the camera 800. The light-field image may be received in a computing device, which may be the camera 800 as in FIG. 2. Alternatively, the computing device may be separate from the camera 800 as in FIG. 3, and may be any type of computing device, including but not limited to desktop computers, laptop computers, smartphones, tablets, and the like.

In a step 2220, a depth map for the light-field image may also be received by the computing device. The depth map may be generated by the camera 800 or by a different computing device, such as the computing device that receives the light-field image for processing in the example of FIG. 3. Generation of the depth map may be accomplished through the use of a wide variety of algorithms, based on the four-dimensional light-field information captured through the use of microlens array 802.

In a step 2230, the depth map may be used to create a plurality of layers in three-dimensional space. The depth map may be used to determine the number of layers and/or the spacing between layers needed for effective layered processing. Each layer may have a representative depth, a minimum depth, and a maximum depth, as will be set forth in greater detail subsequently.

In a step 2240, samples from the light-field image may be projected into the layers in accordance with the depth map to generate a layer image for each layer. More specifically, each sample may include one or more pixels from the light-field image, and may have a sample depth range indicated by the depth map. The sample may thus include pixels of different depths, or alternatively, may include only one pixel or multiple pixels of a single, common depth in the depth map. Each sample may be projected into the layer(s) with depth ranges that include the sample depth range. Thus, the entire light-field image may be divided among the layer images with samples of similar depths in the same layer image.

In a step 2250, one or more image processing algorithms may be applied to the layer images. The image processing algorithms may include any known two-dimensional image processing algorithm, including but not limited to inpainting algorithms, reconstruction algorithms, and enhancement algorithms. These algorithms may be used to prepare the layer images for further processing, correct degradation effects from the image capture process, and/or adjust properties such as color, brightness, contrast, and/or sharpness. Different parameters may be used for each layer image; thus, for each type of image processing algorithm applied, the optimal parameters may be used for each layer image. For any layer image, the same image processing parameters settings may be expected to be effective for all samples within the layer image because all samples from the layer image pertain to the same depth range of the depth map of the light-field image.

In a step 2260, the layer images may be combined to generate a processed light-field image. Combination of the layers may be done by projecting the samples back into a single light-field image. This may optionally be done based on contribution factors for each of multiple subsets of the depth map, and thus, each of multiple subsets of the processed light-field image. For each subset, the contribution factor of each layer may be calculated based on proximity of the representative depth of that layer to the depth in the depth map for that subset. If multiple layer images have samples for a given subset of the processed light-field image, all such samples may be applied to the processed light-field image in proportion to their respective contribution factors. Hence, samples closer to the depth, in the depth map, for a given subset of the processed light-field image may receive greater representation in the processed light-field image.

In a step 2270, the processed light-field image may be displayed for the user. This may be done, for example, by displaying the processed light-field image on a display screen such as the display screen 816 of FIG. 3. The method may then end 2299.

The method of FIG. 6 is only one of many possible methods that may be used to prevent, remove, and/or mitigate undesired effects in a light-field image. According to various alternatives, various steps of FIG. 6 may be carried out in a different order, omitted, and/or replaced by other steps. For example, color space conversion, blurring, Automatic White Balance (AWB) algorithms and/or any other image processing steps set forth above may be incorporated into the method of FIG. 6, at any stage of the method, and may be carried out with respect to the light-field image prior to layer generation, to the layer images, and/or to the processed light-field image generated by combination of the layer images.

The method may help reduce and/or eliminate artifacts from the final image viewed by the user. Thus, the method may provide for a scene that appears, to the user, to be a more realistic approximation of the subject matter captured in the light-field image. The various steps of FIG. 6 will be further described in connection with FIGS. 7A-11C, as follows.

Layer Creation

FIGS. 7A and 7B depict image depth spaces 2300, 2350 illustrating one layer and three layers, respectively. More specifically, FIGS. 7A and 7B illustrate layers that may be created in the step 2230 of the method of FIG. 6. The layers of FIGS. 7A and 7B may subsequently be used for the generation of corresponding layer images in the step 2240 of the method of FIG. 6.

FIG. 7A illustrates an image depth space 2300 with an X-axis 2310, a Y-axis 2312, and a Z-axis, or depth axis 2314. The X-axis 2310 and the Y-axis 2312 may cooperate to define a plane at the location of the microlens array 802 of the camera 800. The depth axis 2314 may define a depth of objects and/or corresponding samples from the microlens array 802. The image depth space 2300 may correspond to the depth map for the light-field image, which may have the same coordinates, and may define a sample depth along the depth axis 2314 for each sample of the light-field image.

As shown, a layer 2320 may be defined in the image depth space 2300. The layer 2320 may have a top t, or minimum depth 2322, a bottom b, or maximum depth 2324, and a center c, or representative depth 2326. The minimum depth 2322 may define a planar boundary of the layer 2320 that is the portion of the layer 2320 closest to the microlens array 802. The maximum depth 2324 may define a planar boundary of the layer 2320 that is the portion of the layer 2320 that is furthest from the microlens array 802.

The representative depth 2326 may define a planar interface between those of the minimum depth 2322 and the maximum depth 2324. This planar interface is at a depth that represents the overall depth of the layer 2320. Optionally, the representative depth 2326 may be positioned halfway between the minimum depth 2322 and the maximum depth 2324. However, in some embodiments, it may be advantageous for a layer to have a representative depth that is closer to its maximum depth than its minimum depth, or closer to its minimum depth than its maximum depth. For example, if the layer 2320 is to be used to generate a layer image for samples of the light-field image ranging from ten feet to fifteen feet from the microlens array 802, but most of the samples in the layer 2320 are at a depth of 11.5 feet from the microlens array 802, it may be advantageous for the representative depth 2326 of the layer 2320 to be at 11.5 feet.

The image depth space 2300 of FIG. 7A is defined according to a Cartesian coordinate system. However, in alternative embodiments, the image depth space 2300, and therefore the layer 2320, may be defined through the use of alternative coordinate systems including but not limited to polar coordinate systems and cylindrical coordinate systems.

FIG. 7B illustrates an image depth space 2350 with an X-axis 2310, a Y-axis 2312, and a Z-axis, or depth axis 2314 like those of the image depth space 2300 of FIG. 7A. The image depth space 2350 may contain three layers, which may be a zero layer 2360, a first layer 2370, and a second layer 2380. Like the layer 2320 of FIG. 7A, the zero layer 2360 may have a top $t_0$, or minimum depth 2362, a bottom $b_0$, or maximum depth 2364, and a center $c_0$, or representative depth 2366. The first layer 2370 may have a top $t_1$, or minimum depth 2372, a bottom $b_1$, or maximum depth 2374, and a center $c_1$, or representative depth 2376. The second layer 2380 may have a top $t_2$, or minimum depth 2382, a bottom $b_2$, or maximum depth 2384, and a center $c_2$, or representative depth 2386.

As shown, a portion of the image depth space 2350 extending from the minimum depth 2362 of the zero layer 2360 to the maximum depth 2384 of the second layer 2380 may be covered by the zero layer 2360, the first layer 2370, and the second layer 2380. The zero layer 2360, the first layer 2370, and the second layer 2380 need not have the same depth; as shown, for example, the second layer 2380 may have a depth (i.e., the minimum depth 2382 subtracted from the maximum depth 2384) greater than that of the zero layer 2360 and the first layer 2370.

Further, as shown, the zero layer 2360, the first layer 2370, and the second layer 2380 may overlap with each other. This is because the maximum depth 2364 of the zero layer 2360 is greater than the minimum depth 2372 of the first layer 2370, and the maximum depth 2374 of the first layer 2370 is greater than the minimum depth 2382 of the second layer 2380. Thus, any given depth between the minimum depth 2362 of the zero layer 2360 and the maximum depth 2384 of the second layer 2380 may be covered by one or two of the zero layer 2360, the first layer 2370, and the second layer 2380.

In alternative embodiments, additional overlap may be used such that three of more layers overlap at one or more depths. In other alternative embodiments, no overlap may be used (i.e., the maximum depth of one layer may be the minimum depth of the adjacent layer). In still other alternative embodiments, the layers may be spaced apart such that some depths are not covered by any layers. Such an embodiment may be used, for example, for a light-field image with one or more samples in the foreground and one or more samples in the background, with the intervening depth containing few or no samples.

In other alternative embodiments, the number of layers need not be three. For example, only two layers may be used. Alternatively, more than three layers may be used. Additional layers may add to the computational load required for the layered image processing procedure, but may also enhance the quality of the processing, and thence lead to generation of a higher-quality processed light-field image.

Pursuant to the step 2230 of the method of FIG. 6, the depth map for the light-field image may be used to create or define layers in a wide variety of ways. In one embodiment, the layers may be created or defined in such a manner that the following constraints are satisfied:

1. All depths existing in the depth field must be covered by at least one layer.
2. When the difference between parameters used in image processing for two different depths is larger than a threshold, two separate layers are created for them.
3. The total number of layers cannot be larger than a threshold.

The first constraint may simply require that all samples of the light-field be contained within one of the layer images to be generated based on the layers. The second constraint may be based on the parameters to be used during application of the image processing algorithms to the layer images in the step 2250 of the method of FIG. 6. As mentioned previously, processing algorithms may use different parameters for different depths. Thus, if the optimal processing parameters used for two different depths exceed a threshold difference, two layers may be created so that images for the two different depth layers can be processed with different parameters. The third constraint may be designed to control the amount of processing power and time required to carry out the image processing method. As mentioned previously, more layers may require more processing time; accordingly, limiting the number of layers created may ensure that layered image processing can be completed in a time frame that is reasonable for the user.

According to one method, the layers may be created based on the constraints set forth above. The method is referred to as a "greedy" method, and may function as follows:

1. $Y = \{\Box\}$
2. Determine the depth center step size $\Delta c$ from the enhancement parameters.
3. Set the depth range $r = 2\Delta c$
4. Find the minimal and maximal depth values, $d_m$ and $d_M$, from $\lambda$.

5. Set $d = d_m$
6. While ($c < d_M$)
7.    If ($\lambda \cdot$ contain($d - 0.5r \cdot d + 0.5r$))
8.       Create a new layer y with $\{c, [b, t]\} = \{d, [d - 0.5r \cdot d + 0.5r]\}$, and two buffers Img and Weight
9.       $Y = \{Y|y\}$
10.    $d = d + \Delta c$ The layer set may first be initialized as empty (line 1). Variation of the parameters used in the image processing algorithms of the step 2250 may be analyzed to determine the maximum allowable step size to approximate performance of the image processing algorithms in a depth-independent manner (line 2). The corresponding depth range may be established (line 3). Then, analysis of the depth map may be conducted to obtain a feasible depth range (line 4). For each step within the depth range (line 5), further steps may be conducted (lines 6-10) to create layers. More specifically, for each step, if the depth map contains certain samples around the step value (line 7), a new layer may be created and inserted into the output layer set (lines 8-9). Besides depth parameters, each layer may be associated with two buffers: Img and Weight, which are used in subsequent steps of the method of FIG. 6.

Layer Image Generation

Once the layers have been created, the associated layer images may be generated in the step 2240 of the method of FIG. 6. This may be accomplished by projecting samples from the light-field image into the layers created previously. This may be accomplished through the use of the light-field image and the depth map. In one embodiment, this may be accomplished through the use of the following method:

1. For each $y_i$ in Y
2.    Initialize all samples in $y_i \cdot$ Img and $y_i \cdot$ Weight to zero
3.    For each sample $L(s, t, u, v)$, compute its projection coordinate $(x, y)$ using the formula $(x, y) = (s - \lambda(s, t, u, v) \cdot (u - u_c), t - \lambda(s, t, u, v) \cdot (v - v_c))$
4.    For each layer $y_i$ in Y
5.       If $\lambda(s, t, u, v) \geq b_i$ and $\lambda(s, t, u, v) \leq t_i$
6.          $y_i \cdot$ Img$(x, y) = y_i \cdot$ Img$(x, y) + L(s, t, u, v) \cdot \omega_d(c_i, \lambda(s, t, u, v))$
7.          $y_i \cdot$ Weight$(x, y) = y_i \cdot$ Weight$(x, y) + \omega_d(c_i, \lambda(s, t, u, v))$
8. For each $y_i$ in Y
9.    For all $(x, y)$ with $y_i \cdot$ Weight$(x, y) > 0$
10. $$y_i \cdot \text{Img}(x, y) = y_i \cdot \frac{\text{Img}(x, y)}{y_i} \cdot \text{Weight}(x, y)$$

First, all samples in the Img and Weight buffers may be set to zero (lines 1-2). For each sample, its coordinate may be calculated (line 3) using the following formula:

$$(x,y) = (s - \lambda(s,t,u,v) \cdot (u - u_c), t - \lambda(s,t,u,v) \cdot (v - v_c))$$

For each layer (line 4), the depth range of the layer may be compared with the depth value of the sample (line 5). If the sample contains only a single pixel, it may have only a single depth value. If the sample contains multiple pixels, it may have a sample depth range. If the sample is within the range (i.e., if the depth value or depth range is above the minimum depth and below the maximum depth for the layer), a weighting factor $\omega_d$ may be computed to determine how much the sample should contribute to the layer (line 6). The weighted contribution to the Img buffer may be accumulated (line 7). The Img buffer may contain the image data for the layer image.

The weighting factor may be a function of the sample depth and the representative depth of the layer. If a sample depth is far from the representative depth of the layer, it may contribute relatively little to the layer image. Conversely, if the sample depth is close to the representative depth of the layer, the sample may contribute heavily to the layer image. In one embodiment, the weighting factor may be determined by a Gaussian radial basis function:

$$\omega_d(a,b) = \exp(-\gamma(a-b)^2)$$

In this function, $\gamma$ may be an adjustable parameter. The samples in Img may then be divided by Weight. This step may be similar to the original projection method, with one difference: because each layer only accepts samples within its depth range, there may be no need to handle conflict between two samples with very different depth values. By comparison with known EDOF projection methods, this may save time and processing power by obviating the need for occlusion handling between conflicted samples.

Layer Image Processing

Once the layer images have been generated, each layer image may be processed in step 2250 of the method of FIG. 6. As mentioned previously, this layer image processing may include the application of multiple image processing algorithms, either singly, or in any suitable combination with one another. Examples include, but are not limited to, inpainting algorithms, reconstruction algorithms, and enhancement algorithms.

Figure 8:
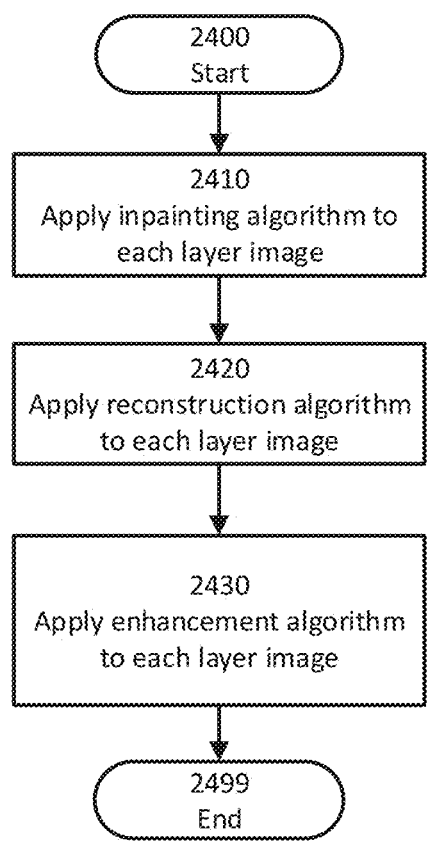
FIG. 8 is a flow diagram depicting a method for processing the layer images generated in the method of FIG. 6, according to one embodiment.

FIG. 8 is a flow diagram depicting a method for processing the layer images generated in the method of FIG. 6, according to one embodiment. The method may start 2400 with a step 2410, in which an inpainting algorithm is applied to each layer image to provide inpainted layer images. Then, in a step 2420, a reconstruction algorithm may be applied to each of the inpainted layer images to provide reconstructed layer images. Then, in a step 2430, an enhancement algorithm may be applied to each of the reconstructed layer images to provide enhanced layer images. The method may then end 2499.

Notably, each of the steps 2410, 2420, 2430 may be performed differently (for example with different parameters) for each of the image layers. In this way, optimal parameter(s) for each of the steps 2410, 2420, 2430 may be applied to each of the layer images. Such parameters may be selected based on the depth (for example, the representative depth) of the layer that corresponds to each layer image.

If desired, entirely different processing algorithms may be applied to different image layers. For example, an enhancement algorithm designed to sharpen features may be applied to layer images with low depth values (i.e., toward the foreground of the light-field image). However, no such algorithm may be applied to layer images with higher depth values (i.e., in the background of the light-field image). Alternatively, a different algorithm, such as a blurring algorithm, may be applied to the layer images with high depth values.

The method of FIG. 8 is only one embodiment of a layer image processing step. In other embodiments, inpainting, reconstruction, and/or enhancement may be re-ordered, omitted, and/or replaced with application of other algorithms.

Figure 9:
FIG. 9 is another exemplary image with artifacts that may be avoided with layered processing.

FIG. 9 is another exemplary image 2500 with artifacts 2510 that may be avoided with layered processing. The artifacts 2510 may be present at the edges of the leaves of the plants, and may cause poor definition of such edges over background objects. Layered image processing of the light-field image used to generate the exemplary image 2500 may be used to obtain better results.

Figure 10:
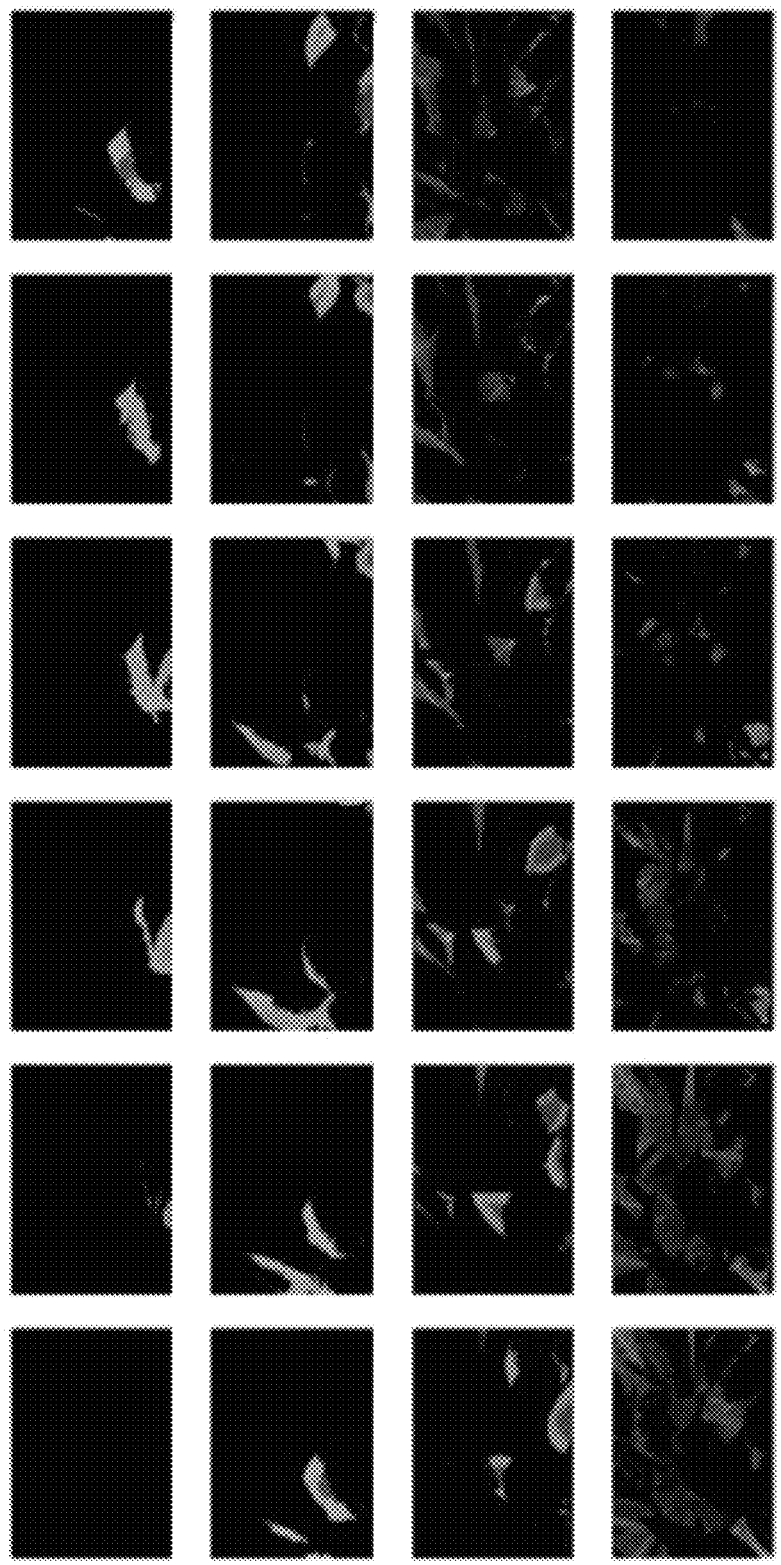
FIG. 10 is a series of layer images illustrating layer images generated from the exemplary image of FIG. 9, according to one embodiment.

FIG. 10 is a series of layer images 2600 illustrating layer images generated from the exemplary image 2500 of FIG. 9, according to one embodiment. For the exemplary image 2500, twenty-four layers may be created and twenty-four corresponding layer images 2600 may be generated. As shown, some portions of the exemplary image 2500 may be present in more than one of the layer images 2600. This may be due to overlap in the depths of the layers created to generate the layer images 2600. Such overlap may help to enhance the results provided by layered processing.

Figure 11C:
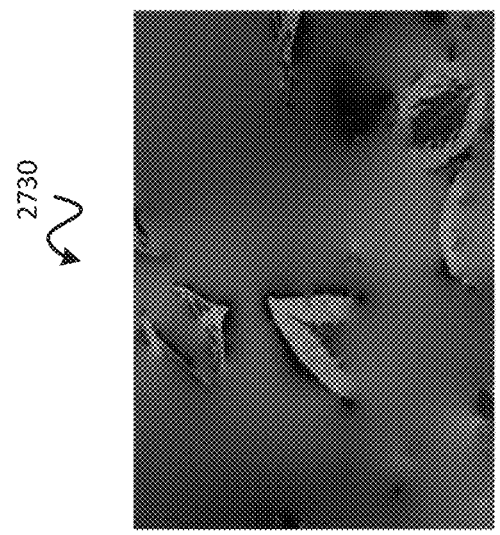
FIGS. 11A, 11B, and 11C illustrate one of the layer images of FIG. 9, prior to inpainting, after inpainting, and after reconstruction and enhancement, respectively, according to one embodiment.
Figure 11B:
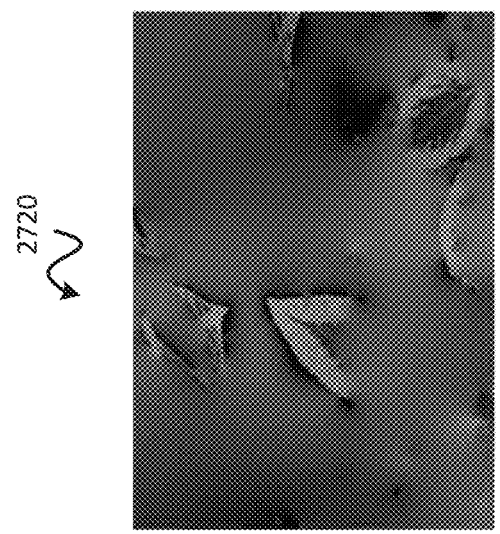
Figure 11A:
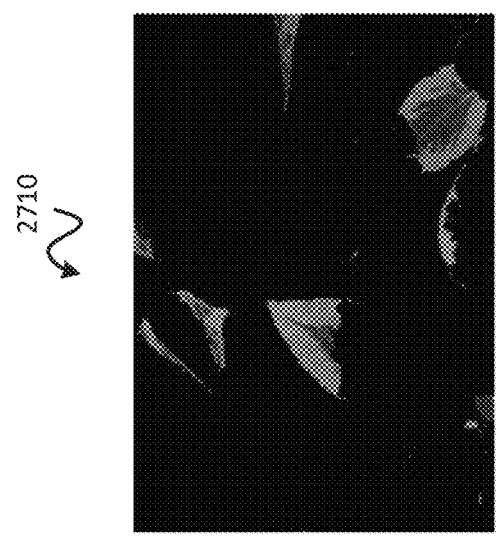

FIGS. 11A, 11B, and 11C illustrate one of the layer images 2600 of FIG. 10, prior to inpainting, after inpainting, and after reconstruction and enhancement, respectively, according to one embodiment. More specifically, FIG. 11A illustrates a layer image 2710 prior to inpainting. FIG. 11B illustrates the layer image 2710 after inpainting has been carried out to generate an inpainted layer image 2720. FIG. 11C illustrates the inpainted layer image 2720 after reconstruction and enhancement have been carried to generate an enhanced layer image 2730.

Inpainting

Pursuant to the step 2410 of FIG. 8, inpainting (also referred to as infilling) may advantageously be carried out to prepare the layer images for further processing, for example, to generate inpainted layer images such as the inpainted layer image 2720 of FIG. 11B. More specifically, after layer projection, each layer image may contain samples, from the light-field image, that are within its depth range. For regions of a layer image into which no sample has been projected (i.e., because that portion of the light-field image did not have a sample within the depth range for the layer), the sample value in Img and Weight may be null. Such regions are illustrated as black regions in the layer image 2710 of FIG. 11A.

Because many image processing algorithms do not allow undefined sample values in the input buffer, it may be advantageous to fill in these undefined regions with some proper information to regularize application of image processing algorithms. Preferably, the data added to these regions should not affect the processing results of the valid regions (i.e., regions of the layer image into which image data has been projected from the light-field image) in any unpredictable way.

Inpainting may be carried out through the use of any of a variety of known inpainting algorithms. Additionally or alternatively, the inpainting algorithm may be that set forth in U.S. Utility application Ser. No. 13/688,026 for "Compensating for Variation in Microlens Position During Light-Field Image Processing", filed on Nov. 28, 2012, which is incorporated by reference herein. Additionally or alternatively, variations of this inpainting algorithm may be used.

The result may be the generation of an inpainted layer image like the inpainted layer image 2720 of FIG. 11B. As shown, the valid regions of the layer image 2710 may not be modified, and the null (i.e., black in FIG. 2710) regions of the layer image 2710 may, in the inpainted layer image 2720, be colored in a manner that defines a smooth transition relative to the valid regions, without artificial structures that could otherwise adversely affect the application of the other image processing algorithms.

Inpainting may be applied to each layer image independently. Thus, in a computing device with multithreading capability, inpainting of multiple layer images may be carried out in parallel to enhance the speed of the inpainting process.

Reconstruction

After inpainting, each layer image may be a two-dimensional image including all samples from the light-field image for objects at a specific depth (i.e., the representative depth of the layer that corresponds to the layer image). As in conventional cameras, the light-field image may be degraded during the image capture process. Such degradation may include blurring due to focusing, noise, lens defects, and/or the like.

Pursuant to the step 2420, one or more reconstruction algorithms may be applied to the inpainted layer images to undo such degradations. Since the inpainted layer images (such as the inpainted layer image 2720 of FIG. 11B) are similar to convention two-dimensional images in many respects, any of a variety of known image reconstruction algorithms may be applied to the inpainted layer images. Such image reconstruction algorithms may include, but are not limited to, Wiener filters, sparse-prior deconvolution algorithms, and the like.

As with performance of the inpainting algorithm(s), reconstruction may be carried out using different algorithms and/or different parameters for each layer image, depending on its layer. Further, reconstruction may be applied to each inpainted layer image independently. Thus, in a computing device with multithreading capability, reconstruction of multiple layer images may be carried out in parallel to enhance the speed of the reconstruction process. Notably, the Weight buffer may represent the reliability of each sample in each layer image; this information may be used by a reconstruction algorithm to expedite and/or enhance the results of the reconstruction process.

Enhancement

After reconstruction, each reconstructed layer image may be ready for further two-dimensional image processing. In many case, a degradation-free image is not pleasing as most viewers would prefer some enhancements. Such enhancements may entail the adjustment properties of each reconstructed layer image, such as color, brightness, contrast and/or sharpness.

Pursuant to the step 2430, one or more enhancement algorithms may be applied to the reconstructed layer images to perform such enhancements. Since the reconstructed layer images are similar to convention two-dimensional images in many respects, any of a variety of known enhancement algorithms may be applied to the inpainted layer images.

As with performance of the inpainting and/or reconstruction algorithm(s), enhancement may be carried out using different algorithms and/or different parameters for each layer image. Further, enhancement may be applied to each reconstructed layer image independently. Thus, in a computing device with multithreading capability, enhancement of multiple layer images may be carried out in parallel to enhance the speed of the enhancement process. Again, the Weight buffer may be used by an enhancement algorithm to expedite and/or enhance the results of the enhancement process.

Combination of Layer Images

As described in connection with FIG. 6, once image processing of the layer images is complete, the processed (i.e., inpainted, reconstructed, and/or enhanced) layer images may be combined to generate the processed light-field image. This may be done in the step 2260 of FIG. 6, and may be carried out in a variety of ways.

In some embodiments, combining the processed layer images may entail selecting the valid samples from each layer image, and blending them properly in the processed light-field image. The depth map provided for the original light-field image (or a similar depth map derived from it) may advantageously be used to obtain the depth value at each location of the processed light-field image.

According to one embodiment, a combination process may be carried out as follows:

| | |
|---|---|
| 1. | For each (x, y) in E |
| 2. | S = 0, W = 0, d = D(x, y) |
| 3. | For each layer $y_i$ in Y |
| 4. | w = $\omega_b$(d, $c_i$) |
| 5. | If w > 0 |
| 6. | S = S + w · $y_i$, Img(x, y) |
| 7. | W = W + w |
| 8. | E(x, y) = $\frac{S}{W}$ |

For each location (x, y) in the processed light-field image (lines 1-3), the process may go through all of the processed layer images and use the depth value of the image map in combination with the depth of each layer to determine how much each layer should contribute to that location in the light-field image (line 4). This contribution factor, represented by, may be large when the representative depth of the layer corresponding to the processed layer image layer is close to the depth specified by the image map for that location. The contribution factor may fall off to zero rapidly with increasing distance between the representative depth and the depth specified by the image map. Therefore, each sample in the processed light-field image may be determined primarily by the processed layer images that are closest to the appropriate depth for the sample. In one embodiment, $\omega_b$ may be selected via a Gaussian kernel:

$$\omega_b(a,b)=\exp(-\kappa(a-b)^2)$$

In this equation, κ may be a user-adjustable parameter. The sample in the layer weighted by $\omega_b$ may be accumulated into the sample of the processed light-field image if it is not zero (lines 5-7). Finally, the sample value may be normalized by the total contribution from all contributing layers (line 8). The result may be that the processed light-field image has a relatively high level of overall quality, without the artifacts that may be produced by conventional (i.e., non-layered) processing methods.

Figure 12:
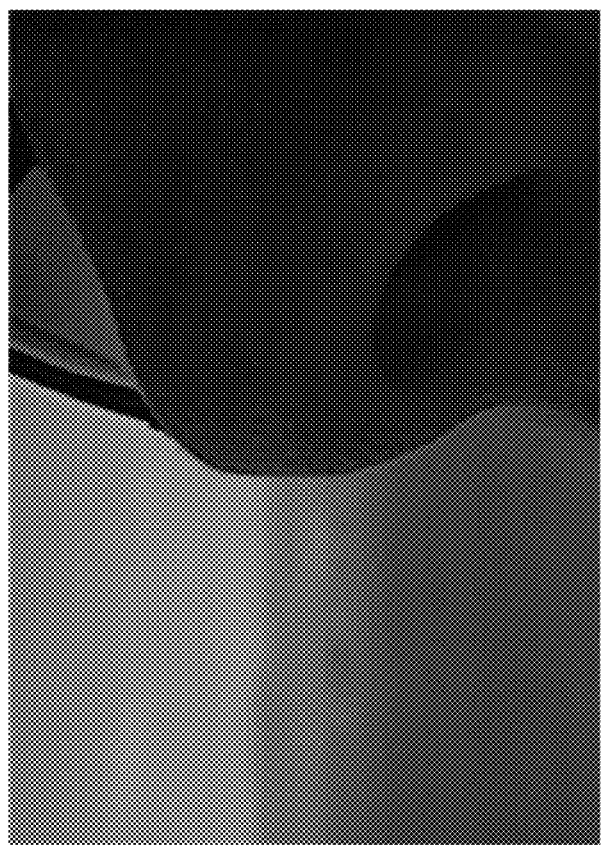
FIG. 12 illustrates an exemplary image comparable to that of FIG. 5, after layered processing, according to one embodiment.

FIG. 12 illustrates an exemplary image 2800 comparable to that of FIG. 5, after layered processing, according to one embodiment. As shown, the exemplary image 2800 has qualities such as sharpness, color, and detail that are similar to those of the exemplary image 2100 of FIG. 5. However, the exemplary image 2800 lacks the artifacts of the exemplary image 2100, and may thus be preferable to the user.

Variations

If desired, a large light-field image may be broken into tiles. Each of the tiles may then be processed through the use of the layered processing systems and methods set forth above. If desired, multiple tiles may be processed in parallel to take advantage of multithreading capabilities of many known processes. Further, such tiled processing may be advantageous in that, because the depth range in a small tile is usually much smaller than that of an entire light-field image, the number of required layers can be much smaller. Thus, computation time and/or resources may be significantly reduced.

Advantageously, the layered processing systems and methods outlined herein need not constrain the type of processing algorithms, such as reconstruction and/or enhancement algorithms, that can be applied to each layer. Thus, even a processing algorithm that performs some spatially-variant processing may be applied to a layer image without disrupting the overall layered processing of the light-field image. Depth-dependent parameter settings may be used to process each layer image without introducing artifacts.

The processed light-field image may be a regular two-dimensional image. Hence, the processed light-field image may be further processed and/or enhanced through the application of known two-dimensional image processing algorithms without depth-dependent parameters.

Notably, the system and method of the present invention may be used with any light-field data. Thus, the light-field data may be captured by a camera as described above, or may be received from another source, such as a computer simulation. The system and method of the present invention may be used with simulated light-field data (such as computer-generated data) to provide a processed, simulated light-field image.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. In a light-field image capture device having a sensor and a plurality of microlenses, a method for reconstructing a light-field image, the method comprising:
   in a processor, receiving the light-field image and a depth map containing a first sample depth range for a first sample of the light-field image and a second sample depth range for a second sample of the light-field image;
   in the processor, generating a first layer image comprising the first sample and a second layer image comprising the second sample;
   in the processor, processing the first and second layer images by:
      applying a first image processing algorithm to the first layer image to generate a first processed layer image; and
      applying a second image processing algorithm to the second layer image to generate a second processed layer image;
   in the processor, combining the first processed layer image with the second processed layer image to generate a processed light-field image; and
   on a display device, displaying the processed light-field image;
   wherein generating the first layer image and the second layer image comprises:
   based on one or more processing parameters of the group consisting of the first image processing algorithm and the second image processing algorithm, determining a maximum depth spacing between layers;
   defining a first layer with a first minimum depth, a first maximum depth, and a first representative depth between the first minimum and maximum depths; and
   defining a second layer with a second minimum depth, a second maximum depth, and a second representative depth between the second minimum and maximum depths, wherein the second representative depth is displaced from the first representative depth by a displacement less than or equal to the maximum depth spacing.

2. The method of claim 1, wherein the depth map further contains a plurality of additional sample depth ranges, each of which applies to one of a plurality of additional samples of the light-field image, the method further comprising:
   in the processor, generating a plurality of additional layer images, each of which comprises at least one of the plurality of additional samples;
   in the processor, processing the plurality of additional layer images by applying a plurality of additional layer processing algorithms to the plurality of additional layer images to generate a plurality of additional processed layer images; and
   in the processor, combining the plurality of additional processed layer images with the first and second processed layer images to further generate the processed light-field image.

3. The method of claim 1, wherein combining the first processed layer image with the second processed layer image comprises applying a Gaussian kernel by, for each subset of multiple subsets of the depth map:
   calculating a first contribution factor for the first layer, wherein the first contribution factor is based on proximity between the first representative depth and a first depth, within the depth map, of a first portion of the first processed layer image corresponding to the subset;
   calculating a second contribution factor for the second layer, wherein the second contribution factor is based proximity between the second representative depth and a second depth, within the depth map, of a second portion of the second processed layer image corresponding to the subset;
   adding the first portion to the processed light-field image in proportion to the first contribution factor; and
   adding the second portion to the processed light-field image in proportion to the second contribution factor.

4. The method of claim 1, wherein generating the first layer image further comprises determining that the first sample depth range is between the first minimum and maximum depths;

wherein generating the second layer image further comprises determining that the second sample depth range is between the second minimum and maximum depths.

5. The method of claim 4, wherein generating the first layer image further comprises:
applying a first weight to the first sample, wherein the first weight is indicative of a first magnitude of a first offset between the first representative depth and the first sample depth range; and
projecting the first sample into the first layer in proportion to the first weight;
wherein generating the second layer image further comprises:
applying a second weight to the second sample, wherein the second weight is indicative of a second magnitude of a second offset between the second representative depth and the second sample depth range; and
projecting the second sample into the second layer in proportion to the second weight.

6. The method of claim 5, wherein applying the first image processing algorithm to the first layer image comprises applying a first reconstruction algorithm to the first layer image to correct degradation effects from capture of the first sample, wherein applying the first reconstruction algorithm comprises utilizing the first weight to determine a first level of reliability of the first sample;
and wherein applying the second image processing algorithm to the second layer image comprises applying a second reconstruction algorithm to the second layer image to correct degradation effects from capture of the second sample, wherein applying the second reconstruction algorithm comprises utilizing the second weight to determine a second level of reliability of the second sample.

7. The method of claim 1, wherein processing the first and second layer images further comprises:
selecting a first processing parameter applied by the first image processing algorithm in processing the first layer image; and
selecting a second processing parameter applied by the second image processing algorithm in processing the second layer image;
wherein the second processing parameter is different from the first processing parameter.

8. The method of claim 1, wherein processing the first and second layer images further comprises, prior to application of the first and second image processing algorithms:
applying a first inpainting algorithm to the first layer image to fill null values of the first layer image in a manner that facilitates application of the first processing algorithm to the first layer image; and
applying a second inpainting algorithm to the second layer image to fill null values of the second layer image in a manner that facilitates application of the second processing algorithm to the second layer image.

9. The method of claim 8, wherein applying the first image processing algorithm to the first layer image comprises applying a first reconstruction algorithm to the first layer image to correct degradation effects from capture of the first sample;
and wherein applying the second image processing algorithm to the second layer image comprises applying a second reconstruction algorithm to the second layer image to correct degradation effects from capture of the second sample.

10. The method of claim 9, wherein applying the first image processing algorithm to the first layer image further comprises applying a first enhancement algorithm to the first layer image to adjust at least one selection from a first group consisting of color of the first sample, brightness of the first sample, contrast of the first sample, and sharpness of the first sample;
and wherein applying the second image processing algorithm to the second layer image further comprises applying a second enhancement algorithm to the second layer image to adjust at least one selection from a second group consisting of color of the second sample, brightness of the second sample, contrast of the second sample, and sharpness of the second sample.

11. The method of claim 1, wherein applying the first image processing algorithm to the first layer image comprises applying a first reconstruction algorithm to the first layer image to correct degradation effects from capture of the first sample;
and wherein applying the second image processing algorithm to the second layer image comprises applying a second reconstruction algorithm to the second layer image to correct degradation effects from capture of the second sample.

12. The method of claim 1, wherein applying the first image processing algorithm to the first layer image further comprises applying a first enhancement algorithm to the first layer image to adjust at least one selection from a first group consisting of color of the first sample, brightness of the first sample, contrast of the first sample, and sharpness of the first sample;
and wherein applying the second image processing algorithm to the second layer image further comprises applying a second enhancement algorithm to the second layer image to adjust at least one selection from a second group consisting of color of the second sample, brightness of the second sample, contrast of the second sample, and sharpness of the second sample.

13. The method of claim 1, further comprising, prior to generating the first layer image, dividing the light-field image into a first tile and a second tile;
wherein the first and second samples are on the first tile;
wherein the depth map further contains a third sample depth range for a third sample on the second tile and a fourth sample depth range for a fourth sample on the second tile;
wherein generating the processed light-field image comprises generating a first processed tile;
wherein the method further comprises:
in the processor, independently of generation of the first layer image and the second layer image, generating a third layer image comprising the third sample and a fourth layer image comprising the fourth sample;
in the processor, independently of processing of the first and second layer images, processing the third and fourth layer images by:
applying a third image processing algorithm to the third layer image to generate a third processed layer image; and
applying a fourth image processing algorithm to the fourth layer image to generate a fourth processed layer image;
in the processor, independently of combination of the first processed layer image with the second processed layer image, combining the third processed layer image with the fourth processed layer image to generate a second processed tile; and in the processor, combining the first processed tile with the second processed tile to generate a combined processed light-field image.

14. A computer program product for reconstructing a light-field image captured by a light-field image capture device having a sensor and a plurality of microlenses, the computer program product comprising:
a non-transitory storage medium; and
computer program code, encoded on the medium, configured to cause at least one processor to perform the steps of:
receiving the light-field image and a depth map containing a first sample depth range for a first sample of the light-field image and a second sample depth range for a second sample of the light-field image;
generating a first layer image comprising the first sample and a second layer image comprising the second sample;
processing the first and second layer images by:
applying a first image processing algorithm to the first layer image to generate a first processed layer image; and
applying a second image processing algorithm to the second layer image to generate a second processed layer image;
combining the first processed layer image with the second processed layer image to generate a processed light-field image; and
causing a display device to display the processed light-field image;
wherein the computer program code configured to cause the at least one processor to generate the first layer image and the second layer image is further configured to cause the at least one processor to perform the steps of:
based on one or more processing parameters of the group consisting of the first image processing algorithm and the second image processing algorithm, determining a maximum depth spacing between layers;
defining a first layer with a first minimum depth, a first maximum depth, and a first representative depth between the first minimum and maximum depths; and
defining a second layer with a second minimum depth, a second maximum depth, and a second representative depth between the second minimum and maximum depths, wherein the second representative depth is displaced from the first representative depth by a displacement less than or equal to the maximum depth spacing.

15. The computer program product of claim 14, wherein the computer program code configured to cause the at least one processor to combine the first processed layer image with the second processed layer image comprises computer program code configured to cause the at least one processor to a Gaussian kernel by, for each subset of multiple subsets of the depth map:
calculating a first contribution factor for the first layer, wherein the first contribution factor is based on proximity between the first representative depth and a first depth, within the depth map, of a first portion of the first processed layer image corresponding to the subset;
calculating a second contribution factor for the second layer, wherein the second contribution factor is based proximity between the second representative depth and a second depth, within the depth map, of a second portion of the second processed layer image corresponding to the subset;
adding the first portion to the processed light-field image in proportion to the first contribution factor; and
adding the second portion to the processed light-field image in proportion to the second contribution factor.

16. The computer program product of claim 14, wherein the computer program code configured to cause the at least one processor to generate the first layer image further comprises computer program code configured to cause the at least one processor to determine that the first sample depth range is between the first minimum and maximum depths;
wherein the computer program code configured to cause the at least one processor to generate the second layer image further comprises computer program code configured to cause the at least one processor to determine that the second sample depth range is between the second minimum and maximum depths.

17. The computer program product of claim 16, wherein the computer program code configured to cause the at least one processor to generate the first layer image further comprises computer program code configured to cause the at least one processor to:
apply a first weight to the first sample, wherein the first weight is indicative of a first magnitude of a first offset between the first representative depth and the first sample depth range; and
project the first sample into the first layer in proportion to the first weight;
wherein the computer program code configured to cause the at least one processor to generate the second layer image further comprises computer program code configured to cause the at least one processor to:
apply a second weight to the second sample, wherein the second weight is indicative of a second magnitude of a second offset between the second representative depth and the second sample depth range; and
project the second sample into the second layer in proportion to the second weight.

18. The computer program product of claim 17, wherein the computer program code configured to cause the at least one processor to apply the first image processing algorithm to the first layer image comprises computer program code configured to cause the at least one processor to apply a first reconstruction algorithm to the first layer image to correct degradation effects from capture of the first sample by utilizing the first weight to determine a first level of reliability of the first sample;
and wherein the computer program code configured to cause the at least one processor to apply the second image processing algorithm to the second layer image comprises computer program code configured to cause the at least one processor to apply a second reconstruction algorithm to the second layer image to correct degradation effects from capture of the second sample by utilizing the second weight to determine a second level of reliability of the second sample.

19. The computer program product of claim 14, wherein the computer program code configured to cause the at least one processor to process the first and second layer images further comprises computer program code configured to cause the at least one processor to perform the steps of:
selecting a first processing parameter applied by the first image processing algorithm in processing the first layer image; and
selecting a second processing parameter applied by the second image processing algorithm in processing the second layer image;

wherein the second processing parameter is different from the first processing parameter.

20. The computer program product of claim 14, wherein the computer program code configured to cause the at least one processor to process the first and second layer images further comprises computer program code configured to cause the at least one processor, prior to application of the first and second image processing algorithms, to perform the steps of:
  applying a first inpainting algorithm to the first layer image to fill null values of the first layer image in a manner that facilitates application of the first processing algorithm to the first layer image; and
  applying a second inpainting algorithm to the second layer image to fill null values of the second layer image in a manner that facilitates application of the second processing algorithm to the second layer image.

21. The computer program product of claim 20, wherein the computer program code configured to cause the at least one processor to apply the first image processing algorithm to the first layer image comprises computer program code configured to cause the at least one processor to apply a first reconstruction algorithm to the first layer image to correct degradation effects from capture of the first sample;
  and wherein the computer program code configured to cause the at least one processor to apply the second image processing algorithm to the second layer image comprises computer program code configured to cause the at least one processor to apply a second reconstruction algorithm to the second layer image to correct degradation effects from capture of the second sample.

22. The computer program product of claim 21, wherein the computer program code configured to cause the at least one processor to apply the first image processing algorithm to the first layer image further comprises computer program code configured to cause the at least one processor to apply a first enhancement algorithm to the first layer image to adjust at least one selection from a first group consisting of color of the first sample, brightness of the first sample, contrast of the first sample, and sharpness of the first sample;
  and wherein the computer program code configured to cause the at least one processor to apply the second image processing algorithm to the second layer image further comprises computer program code configured to cause the at least one processor to apply a second enhancement algorithm to the second layer image to adjust at least one selection from a second group consisting of color of the second sample, brightness of the second sample, contrast of the second sample, and sharpness of the second sample.

23. A system for reconstructing a light-field image captured by a light-field image capture device having a sensor and a plurality of microlenses, the system comprising:
  a processor configured to:
    receive the light-field image and a depth map containing a first sample depth range for a first sample of the light-field image and a second sample depth range for a second sample of the light-field image;
    generate a first layer image comprising the first sample and a second layer image comprising the second sample;
    process the first and second layer images by:
      applying a first image processing algorithm to the first layer image to generate a first processed layer image; and
      applying a second image processing algorithm to the second layer image to generate a second processed layer image; and
      combine the first processed layer image with the second processed layer image to generate a processed light-field image; and
  a display device, communicatively coupled to the processor, configured to display the processed light-field image;
  wherein the processor is further configured to generate the first layer image and the second layer image by:
    based on one or more processing parameters of the group consisting of the first image processing algorithm and the second image processing algorithm, determining a maximum depth spacing between layers;
    defining a first layer with a first minimum depth, a first maximum depth, and a first representative depth between the first minimum and maximum depths; and
    defining a second layer with a second minimum depth, a second maximum depth, and a second representative depth between the second minimum and maximum depths, wherein the second representative depth is displaced from the first representative depth by a displacement less than or equal to the maximum depth spacing.

24. The system of claim 23, wherein the processor is further configured to combine the first processed layer image with the second processed layer image by applying a Gaussian kernel by, for each subset of multiple subsets of the depth map:
  calculating a first contribution factor for the first layer, wherein the first contribution factor is based on proximity between the first representative depth and a first depth, within the depth map, of a first portion of the first processed layer image corresponding to the subset;
  calculating a second contribution factor for the second layer, wherein the second contribution factor is based proximity between the second representative depth and a second depth, within the depth map, of a second portion of the second processed layer image corresponding to the subset;
  adding the first portion to the processed light-field image in proportion to the first contribution factor; and
  adding the second portion to the processed light-field image in proportion to the second contribution factor.

25. The system of claim 23, wherein the processor is further configured to generate the first layer image by determining that the first sample depth range is between the first minimum and maximum depths;
  wherein the processor is further configured to generate the second layer image by determining that the second sample depth range is between the second minimum and maximum depths.

26. The system of claim 25, wherein the processor is further configured to generate the first layer image by:
  applying a first weight to the first sample, wherein the first weight is indicative of a first magnitude of a first offset between the first representative depth and the first sample depth range; and
  projecting the first sample into the first layer in proportion to the first weight;
  wherein the processor is further configured to generate the second layer image by:
    applying a second weight to the second sample, wherein the second weight is indicative of a second magnitude of a second offset between the second representative depth and the second sample depth range; and projecting the second sample into the second layer in proportion to the second weight.

27. The system of claim 26, wherein the processor is further configured to apply the first image processing algorithm to the first layer image by applying a first reconstruction algorithm to the first layer image to correct degradation effects from capture of the first sample, wherein the processor is further configured to apply the first reconstruction algorithm by utilizing the first weight to determine a first level of reliability of the first sample;

and wherein the processor is further configured to apply the second image processing algorithm to the second layer image by applying a second reconstruction algorithm to the second layer image to correct degradation effects from capture of the second sample, wherein the processor is further configured to apply the second reconstruction algorithm by utilizing the second weight to determine a second level of reliability of the second sample.

28. The system of claim h, wherein the processor is further configured to process the first and second layer images by:

selecting a first processing parameter applied by the first image processing algorithm in processing the first layer image; and selecting a second processing parameter applied by the second image processing algorithm in processing the second layer image;

wherein the second processing parameter is different from the first processing parameter.

29. The system of claim h, wherein the processor is further configured to process the first and second layer images by, prior to application of the first and second image processing algorithms:

applying a first inpainting algorithm to the first layer image to fill null values of the first layer image in a manner that facilitates application of the first processing algorithm to the first layer image; and applying a second inpainting algorithm to the second layer image to fill null values of the second layer image in a manner that facilitates application of the second processing algorithm to the second layer image.

30. The system of claim 29, wherein the processor is further configured to apply the first image processing algorithm to the first layer image by applying a first reconstruction algorithm to the first layer image to correct degradation effects from capture of the first sample;

and wherein the processor is further configured to apply the second image processing algorithm to the second layer image by applying a second reconstruction algorithm to the second layer image to correct degradation effects from capture of the second sample.

31. The system of claim 30, wherein the processor is further configured to apply the first image processing algorithm to the first layer image by applying a first enhancement algorithm to the first layer image to adjust at least one selection from a first group consisting of color of the first sample, brightness of the first sample, contrast of the first sample, and sharpness of the first sample;

and wherein the processor is further configured to apply the second image processing algorithm to the second layer image by applying a second enhancement algorithm to the second layer image to adjust at least one selection from a second group consisting of color of the second sample, brightness of the second sample, contrast of the second sample, and sharpness of the second sample.

* * * * *

UNITED STATES PATENT AND TRADEMARK OFFICE
CERTIFICATE OF CORRECTION

PATENT NO. : 9,444,991 B2  
APPLICATION NO. : 14/540922  
DATED : September 13, 2016  
INVENTOR(S) : Chia-Kai Liang et al.

Page 1 of 1

It is certified that error appears in the above-identified patent and that said Letters Patent is hereby corrected as shown below:

In the Claims

• Column 27, line 20 (claim 28): please replace "claim h" with --claim 23--

• Column 27, line 31 (claim 29): please replace "claim h" with --claim 23--

Signed and Sealed this  
Eighth Day of November, 2016

Michelle K. Lee  
*Director of the United States Patent and Trademark Office*